United States Patent
Newman

(10) Patent No.: US 11,125,207 B2
(45) Date of Patent: Sep. 21, 2021

(54) MAGNUS ROTORS AS A MEANS OF IMPROVING THE PERFORMANCE OF SAVONIUS ROTORS AND VEHICLES

(71) Applicant: Edwin Steven Newman, Palmdale, CA (US)

(72) Inventor: Edwin Steven Newman, Palmdale, CA (US)

(*) Notice: Subject to any disclaimer, the term of this patent is extended or adjusted under 35 U.S.C. 154(b) by 99 days.

(21) Appl. No.: 16/602,953

(22) Filed: Jan. 2, 2020

(65) Prior Publication Data

US 2021/0207578 A1 Jul. 8, 2021

(51) Int. Cl.
*F03D 3/06* (2006.01)
*B62D 35/00* (2006.01)
*F03D 3/00* (2006.01)

(52) U.S. Cl.
CPC .............. *F03D 3/007* (2013.01); *B62D 35/00* (2013.01); *F03D 3/062* (2013.01)

(58) Field of Classification Search
CPC .... B62D 35/00; B62D 35/001; B62D 35/002; B62D 35/005; B62D 35/008; B62D 35/02; F03D 3/005; F03D 3/061; F03D 3/062; F03D 3/065; F03D 3/06; F03D 3/007; F03D 7/06; F03D 7/0252; F03D 7/022; F03D 7/024; F03D 7/0236; F03D 80/00; F03D 9/32; F03D 9/12; F03D 5/00; F03D 1/0616
See application file for complete search history.

(56) References Cited

U.S. PATENT DOCUMENTS

| | | | | |
|---|---|---|---|---|
| 3,120,275 | A * | 2/1964 | Pfleiderer | B64C 27/54 416/4 |
| 4,113,299 | A * | 9/1978 | Johnson | B62D 35/001 188/2 R |
| 10,583,872 | B1 * | 3/2020 | Chen | B62D 35/00 |
| 2014/0008916 | A1 * | 1/2014 | Shimizu | F03D 3/007 290/55 |

FOREIGN PATENT DOCUMENTS

DE 102014104674 A1 * 10/2014 ............. F03D 3/06

OTHER PUBLICATIONS

Machine Translation of DE-102014104674-A1. Accessed EPO website on Jun. 7, 2021. (Year: 2021).*

* cited by examiner

*Primary Examiner* — Richard A Edgar

(57) ABSTRACT

A means of reducing fluid density in front of Savonius blades by installing magnus rotors to accelerate onrushing fluid away from the blade itself. Several magnus rotors are mounted on either external side of the centerline of each blade, so as the Savonius rotor is revolved by the surrounding fluid and the magnus rotors are revolved on either side of the centerline in opposite directions, then fluid pressure is reduced and the Savonius rotor's speed is increased. Also, if the magnus rotor is formed from a sheathed flexible shaft and attached to an underlying contoured surface of a vehicle, such as a racing car or a helical Savonius rotor, fluid resistance to the forward motion of the vehicle is reduced.

1 Claim, 1 Drawing Sheet

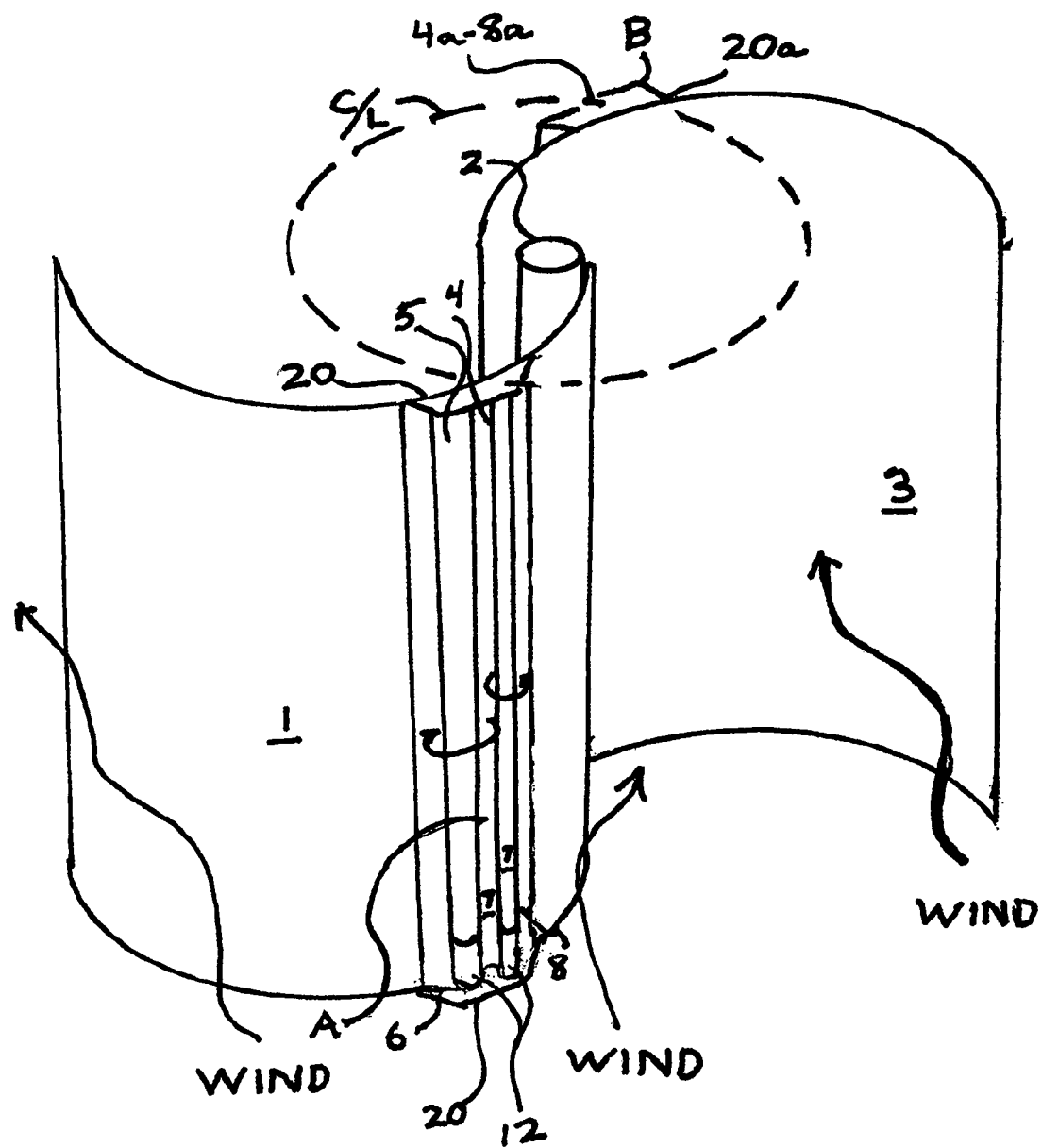

MAGNUS ROTORS AS A MEANS OF IMPROVING THE PERFORMANCE OF SAVONIUS ROTORS AND VEHICLES

BACKGROUND OF THE INVENTION

Reducing fluid density at certain locations about Savonius rotors and vehicles can improve the performance of these structures by reducing fluid friction through the medium through which these structures are made to travel.

A circular cylinder made to spin in a fluid made to move crosswise to the axis of spin is known as a Magnus Rotor. This device is made to produce a fluid dynamic side force, perpendicular to both the fluid direction and the axis of spin. For example, a cylinder made to spin on its central axis in a wind, with that axis horizontal, made to spin so its lower surface is made to move against the wind, produces a lifting force. This force has been studied both theoretically and experimentally. and was found to be about ten times as strong as the corresponding force produced by an airfoil when compared at equal projected area, air speed, and air density, if the cylinder were spun fast enough. The power input for a Magnus Rotor is found by using the formula P=the coefficient of friction times the density of air times the cube of the angular velocity times pi times the radius to the fourth power times the length. (from USDOE Grant Report DOE/R6/0969).

While the Flettner patent (Re18,122) shows many variations of a Magnus Rotor, all these variants show the rotor only rooted at one end. This complicates the stability of the rotor, for example dealing with the presence of gyroscopic forces.

SUMMARY OF THE INVENTION

In the preferred embodiment, at least two long and thin magnus rotors are placed vertically on the leading surface of a Savonius Rotor spinning in opposite directions so that oncoming air is speeded up, creating a low pressure volume of air, drawing the Savonius Rotor forward (ie. creating a lifting force) and lowering air resistance.

BRIEF DESCRIPTION OF THE DRAWING

FIG. 1 is a perspective view of a Savonius Rotor with the invention installed on it.

DETAILED DESCRIPTION OF THE PREFERRED EMBODIMENT

Turning to FIG. 1 we see a perspective view of a Savonius Rotor 1,3 balanced round a shaft 2. On either side of the centerline of Savonius blade 1 we see Magnus rotors 4,5. Air control guides 6,7,8 are shown on either side of the magnus rotors. Identical structures 4a-8a are shown affixed to Savonius blade 3. The arrows show airflow as well as the direction of spin of the Savonius Rotor. Shown is a Savonius rotor of a straight blade design.

In FIG. there is shown a magnus rotor 4 affixed on either end to brackets 19,20, affixed in their turn to the rotor blade 1 or 3. The magnus rotor itself has no end pieces for reasons of efficiency, as was demonstrated in the experimental work recorded in USDOE Grant Report DE-FG46-79R610969. Motor 9 provides the power to operate magnus rotor 4.

In operation, Savonius blades are made to rotate about shaft 2 by wind. At the same time motors 10 are made to revolve magnus rotors 4,4a,5,5a in directions away from the centerlines of blades 1,3 at high rates of speed. This action produces a relative vacuum at areas A,B as well as lowering the air pressure at the outer surfaces of blades 1,3. Thus more torque is produced by shaft 2.

From the above descriptions it is apparent that the preferred embodiments achieve the object of the invention. Alternative embodiments and various depictions of the present embodiments will be apparent to those skilled in the relevant arts.

I claim:

1. An air guidance system comprising:
   an outer surface of a Savonius rotor;
   said outer surface having a centerline each side of said centerline having at least one motorized Magnus rotor and at least one airflow guide placed normal to a fluid stream directed at said outer surface; and
   said at least one airflow guide being placed adjacent to each of said at least one motorized Magnus rotors;
   wherein the Magnus rotors located on each side of the centerline are rotated in opposite directions with respect to said centerline at a higher velocity than said fluid stream so fluid pressure is lowered in front of said outer surface and said fluid stream is accelerated over said outer surface thus increasing torque on a shaft of said Savonius rotor.

\* \* \* \* \*